(12) United States Patent
Wallenius et al.

(10) Patent No.: US 7,269,428 B1
(45) Date of Patent: Sep. 11, 2007

(54) METHOD FOR ENABLING A USER TO BE NOTIFIED OF HIS/HER POSITIONING REQUESTS

(75) Inventors: Jukka Wallenius, Helsinki (FI); Serge Haumont, Helsinki (FI); Jan Kall, Espoo (FI)

(73) Assignee: Nokia Coporation, Espoo (FI)

( * ) Notice: Subject to any disclaimer, the term of this patent is extended or adjusted under 35 U.S.C. 154(b) by 0 days.

(21) Appl. No.: 10/130,407

(22) PCT Filed: Nov. 23, 1999

(86) PCT No.: PCT/EP99/09043

§ 371 (c)(1),
(2), (4) Date: Aug. 13, 2002

(87) PCT Pub. No.: WO01/39528

PCT Pub. Date: May 31, 2001

(51) Int. Cl.
*H04M 1/00* (2006.01)
(52) U.S. Cl. .............................. 455/456.2; 455/412.2; 455/404.2
(58) Field of Classification Search ................ 455/456, 455/460, 456.2, 412.1, 404.2, 414.3
See application file for complete search history.

(56) References Cited

U.S. PATENT DOCUMENTS

| | | | | |
|---|---|---|---|---|
| 5,852,775 A | * | 12/1998 | Hidary | 455/412.1 |
| 5,918,159 A | * | 6/1999 | Fomukong et al. | 340/7.21 |
| 5,950,137 A | * | 9/1999 | Kim | 455/456.2 |
| 6,163,701 A | * | 12/2000 | Saleh et al. | 455/456.2 |
| 6,311,069 B1 | * | 10/2001 | Havinis et al. | 455/456.4 |
| 6,374,107 B1 | * | 4/2002 | Boylan et al. | 455/432.3 |
| 6,442,391 B1 | * | 8/2002 | Johansson et al. | 455/456.2 |
| 6,556,831 B1 | * | 4/2003 | Buppelmann | 455/456.2 |
| 6,560,461 B1 | * | 5/2003 | Fomukong et al. | 455/456.2 |
| 6,721,542 B1 | * | 4/2004 | Anttila et al. | 455/68 |

FOREIGN PATENT DOCUMENTS

WO     WO99/55115     10/1999

* cited by examiner

*Primary Examiner*—Duc M. Nguyen
*Assistant Examiner*—Chuck Huynh
(74) *Attorney, Agent, or Firm*—Alston & Bird LLP (57) ABSTRACT

The present invention proposes a method for processing an information request in a communication network, wherein a requesting side contacts a first element of said communication network and sends a request for specific information of a subscriber, said method comprising the steps of receiving a request for subscriber specific information, processing the rest for said subscriber specific information, wherein in said processing a second network element is triggered, checking by said second network element, whether a permission for releasing said subscriber specific information to said requesting side is present, and, if a permission for releasing is present, forwarding said subscriber specific information to said requesting side, and if no permission for releasing is present, refusing the request for said subscriber specific information. The present invention also proposes a corresponding device and/or system. The present invention enables a consultation of the subscriber whether he/she permits a release of information concerning him/her, e.g. by using an intelligent network environment.

38 Claims, 8 Drawing Sheets

METHOD FOR ENABLING A USER TO BE NOTIFIED OF HIS/HER POSITIONING REQUESTS

FIELD OF THE INVENTION

The present invention relates to a method for processing an information request in a communication network, and also relates to a corresponding device and/or a corresponding system. In particular, the present invention is directed to a method and corresponding device and corresponding system for managing subscriber location information in telecommunication networks.

BACKGROUND OF THE INVENTION

In the last years, telecommunication systems, in particular mobile telecommunication systems such as GSM (Global System for Mobile communication) and the like, became widely spread all over the world. Due to an increasing competition between network operators the offering of additional services besides the initial object of transmitting speech becomes more and more important.

Recently, a more flexible telecommunication network architecture has been developed, namely the intelligent network (IN). One example of such an intelligent network is CAMEL (Customized Applications for Mobile network Enhanced Logic) which is accommodated to the GSM system. The aim of such intelligent networks is for example to enable the creation of customized services that could be used by subscribers as well as by network operators. Furthermore, the introduction of new services in telecommunication networks shall be facilitated. The central authority in such an intelligent network is a so-called service control point (SCP) which controls distinct calls.

In mobile telecommunication systems, it is essential to know where a subscriber, i.e. a terminal equipment such as a mobile station MS, is located. That is, the location of the subscriber within the network, at least in which area or cell of the network, has to be detectable. There are several methods, as commonly known by persons skilled in the art, by which the location of the subscriber can be determined.

As one possibility, the location can be detected, for example, by accessing a Mobile Location Centre (MLC) for obtaining the latest position of the terminal. For external users, so-called Gateway Mobile Location Centres (GMLC) are provided, which can be directly connected to an external user. These Location Centres (MLC, GLMC) determine the Mobile services Switching Centres (MSC) or Visited Mobile services Switching Centres (VMSC) currently connected to the subscriber in question on the basis of a Home Location Register (HLR) inquiry. By this measure, the latest position can easily be obtained by referring to network elements already implemented in the network.

While it is commonly known that the location information is used for call routing services and the like, also other implementations for the location information are intended.

One example is to use the location information for forwarding specified information to the subscriber, depending on his/her position within the telecommunication network. That is, external users and/or the network operator send e.g. advertisements, tourist information or the like concerning the area in which the subscriber is located.

Therefore, it is necessary, that the sending side knows in which area the subscriber is located, or which subscribers are within a specified area. To obtain this location information, it is to be requested from the telecommunication network. A corresponding request is directed for example to the GMLC by the requesting external user or network operator, and, if the requesting side has access rights for the location information, the GMLC returns the respective location information of the subscriber in question.

However, there is a certain drawback in the above described location requesting method. Hitherto, the GMLC only contains access control records. The subscriber (or user), to whom the specified information is to be forwarded and whose location information is requested, is not directly involved in the decision process whether the request shall be fulfilled or not. Therefore, it is not possible for the user to control to which requesting part the location information is released, i.e. which information (advertisement and the like) he/she receives.

U.S. Pat. No. 5,950,137 discloses a method to provide location information of a target MS to a requesting MS. For this purpose, a secret number is checked in order to decide whether the information is to be released or not.

Document WO 99 55115 discloses the provision of location override keys which can be used to disable privacy settings. Those privacy settings are set by a subscriber beforehand in order to prevent a location application from positioning the MS/subscriber.

U.S. Pat. No. 5,852,775 discloses a method to use advertisements to make calls less expensive. When a registered MS/subscriber establishes a call he is asked, whether advertisements are accepted.

SUMMARY OF THE INVENTION

Therefore, it is an object of the present invention to provide a method for processing an information request in a telecommunication system and also a corresponding device and/or system, which provide an improved control for a subscriber to handle said information request.

According to the present invention, this object is achieved by a method for processing an information request in a communication network, wherein a requesting side contacts a first element of said communication network and sends a request for specific information of a subscriber, said method comprising the steps of receiving a request for subscriber specific information; processing the request for said subscriber specific information, wherein in said processing a second network element is triggered; characterized by contacting said subscriber and transmitting a message indicating said request of said requesting side for a decision of said subscriber on the basis of said transmitted message, whether to release said subscriber specific information or not; receiving and determining said decision of said subscriber; and, if a permission for releasing is present, forwarding said subscriber specific information to said requesting side, and if no permission for releasing is present, refusing the request for said subscriber specific information.

Furthermore, the present invention proposes a device used in a communication network for processing an information request for specific information of a subscriber issued by a requesting side, said information request is received by said device via a first element of said communication network, characterized by receiving means adapted to receive said request for subscriber specific information; means adapted to process the request for subscriber specific information, to contact said subscriber and to transmit a message indicating said request of said requesting side for a decision of said subscriber on the basis of said transmitted message, whether to release said subscriber specific information or not, to receive said decision of said subscriber and to check on the basis of said decision of said subscriber whether a permission for releasing said subscriber specific information to said requesting side is present, and means adapted to forward said subscriber specific information to said requesting side, if a permission for releasing is present.

Moreover, according to the present invention, there is proposed a communication system, said system comprising at least a terminal device of a subscriber; a base station subsystem for connecting said terminal device; a serving center for controlling communication connections to and from said terminal device; and a location center for detecting the location of said terminal device within said communication system; characterized by a service control point for providing an operator tailored positioning policy service and triggered by said service center or said location center to perform said operator tailored positioning policy service, wherein said operator tailored positioning policy service is adapted to involve said subscriber in a decision, whether a request for subscriber specific information made by a requesting side is to be fulfilled or not, by contacting said subscriber and transmitting a message indicating said request of said requesting side for said decision of said subscriber on the basis of said transmitted message, whether to release said subscriber specific information or not, and by receiving and determining said decision of said subscriber. Advantageous further developments of the present invention are as set out in the respective dependent claims.

According to the present invention, the proposed method and/or device and/or system are very easy implemented since the usage of the Intelligent Network service environment, for example a CAMEL service environment CSE, for triggering an operator tailored positioning policy service provides a very good compatibility with other different network elements used for the location request. That is, it is e.g. possible to trigger said operator tailored positioning policy service when the location request (or another subscriber specific information request, respectively) is send to the VMSC connected to said subscriber, wherein said request is sent in the form of a mobile application part (MAP) location request, e.g. a MAP Provide Subscriber Location request. Alternatively, it is also possible to use the HLR for triggering, wherein the request is sent in the form of a MAP information request, e.g. a MAP Send Info for LCS request.

It is to be noted, that according to the invention the SCP can be triggered by various network elements, such as the GMLC, the VMSC, the HLR and the like, depending on the design of the network. Moreover, the present invention is also applicable in an packet switched network environment such as general packet radio services GPRS. That is, the SCP can also be triggered for example by a serving GPRS support node (SGSN).

As commonly known, the home location register (HLR) records contain several information about the subscriber. According to the present invention, there are also stored information that in case of a request for subscriber specific information such as location information the corresponding intelligent network element SCP (i.e. the operator tailored positioning policy service) is triggered. The network address of the SCP is also stored in the HLR.

Furthermore, the subscriber specific information can be requested by several different stations, for example by a service provider or by another subscriber located in the same or in a different area.

According to the present invention, it is further possible to define different decision modes. One is for example to directly contact the subscriber in question and to ask for the permission to fulfill the request for e.g. location information. Contacting the subscriber (i.e. the terminal device) can be performed for example by sending a short message (SMS), a unstructured supplementary service data (USSD) message, a wireless telephony application (WTA) indication by using a WTA service, and the like. This message may contain an identification of the requesting side.

The message can be delivered to the mobile station for example via a wireless application protocol (WAP) content push. The content of the message can include several forms. For example, it is possible that the content includes Java. Also other contents produced by the respective terminal (mobile station, SCP) are possible.

A message concerning a decision whether to fulfill the request or not can be sent back to the network via the same kind of message service, or also via another message service different to that used before. The message types are definable for example by the network operator.

The identification of the requesting side can have various forms commonly known to persons skilled in the art. Most preferably, it should enable the subscriber to easy identify the requesting side, for example by a name or a logo or the like.

Also, an indication of the reason of the request, for example sending of tourist information, can be indicated.

Therefore, it is also possible to filter location requests not only by checking the identification of the requesting side (i.e. who is requesting), but also by the reason why the location information (or other subscriber specific information) are requested. For example, when a requesting side is able to send advertisement as well as tourist information, but the subscriber wishes only to receive the latter, it is possible to refuse requests due to advertisements and fulfill requests due to tourist information.

Alternatively, as a further decision mode, it is possible to check whether the requesting side is authorized to request subscriber specific information. This may be especially the case for service providers. On the basis of a comparison of the identification of the requesting side with an table or the like, in which authorized identifications are stored, it is possible to decide whether to fulfill a location information request or not.

The authorized identification can be input by the subscriber in advance and/or by the network operator.

It is also possible to define an automatic decision mode, in which it is preset by the subscriber, whether to fulfill requests of all requesting sides independent of which kind they are, or to refuse all location requests of the kind described above. Furthermore, it is also possible for the subscriber to define a specified requesting side or group of requesting sides for which a request shall be fulfilled.

This can be performed for example by forming a table or the like.

Moreover, according to the present invention, there is provided an ability for logging all requests for subscriber specific information, for example in a memory.

Preferred embodiments of the invention are described herein below in detail by way of example with reference to the accompanying drawings.

DESCRIPTION OF PREFERRED EMBODIMENTS

Figure 1:
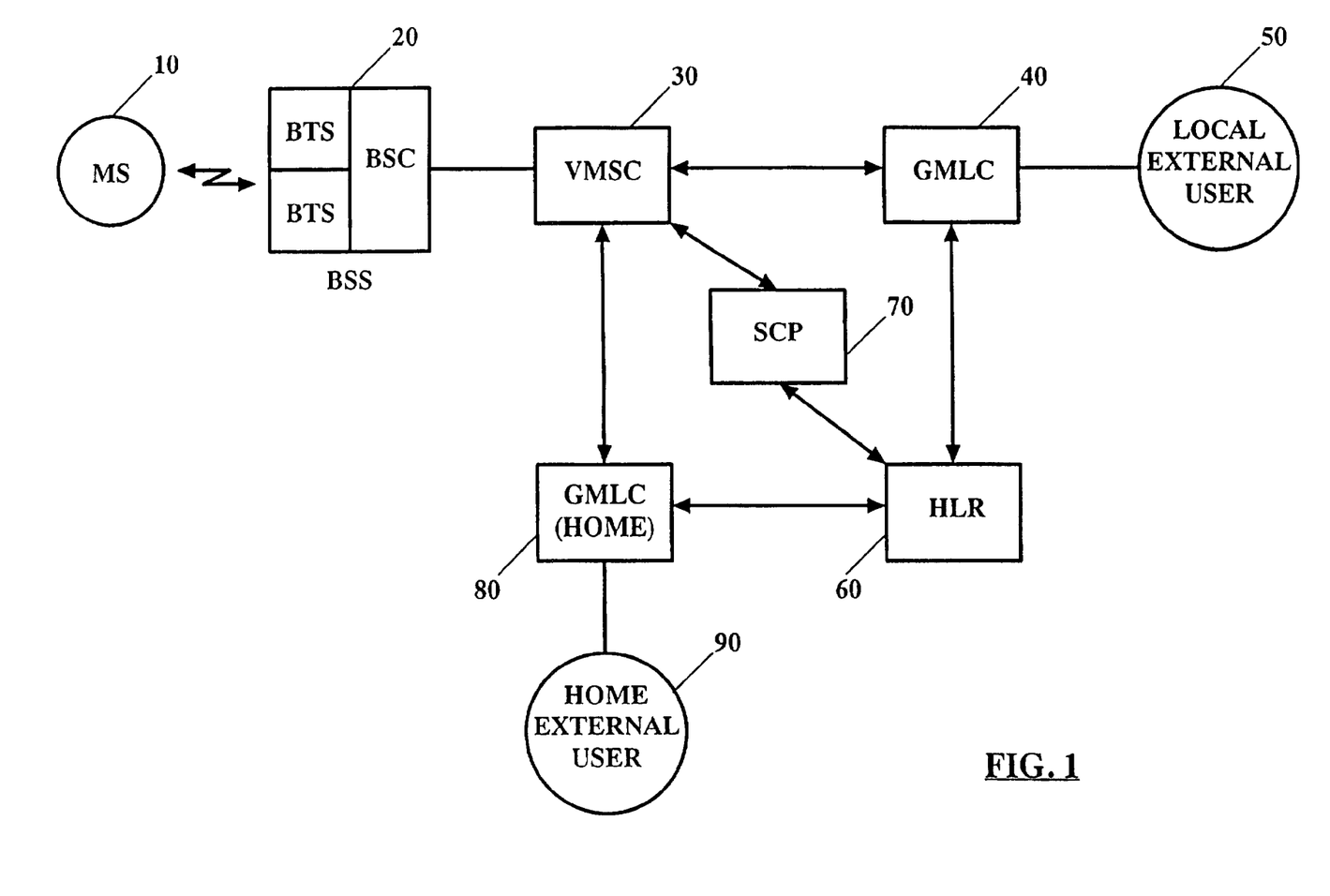
FIG. 1 shows a block circuit diagram of a simplified structure of a telecommunication network.

In FIG. 1, one simplified example of a telecommunication network such as a GSM network is shown. It is to be noted that the example shown in FIG. 1 illustrates a case in which a subscriber (mobile station MS) is located in a network different to his/her home network, i.e. he/she is located in a so-called visited network. However, it is obvious that the present invention, implemented in a network structure such as shown in FIG. 1 and described below, also works in the home network area.

Reference numeral 10 denotes a terminal device such as a mobile station MS of a subscriber. Reference numeral 20 denotes a base station subsystem BSS which comprises at least one base transceiver station BTS and a base station controller BSC. The base station subsystem is arranged to communicate with the mobile station 10.

Reference numeral 30 denotes a visited mobile service switching center VMSC. The mobile service switching center is arranged to control the communication to and from the mobile station. Here, the VMSC is located in a so-called visited area, i.e. a communication area within the communication network, which is not the home area. However, it is obvious that the MSC 30 could be also an MSC located in the home area of the subscriber.

Reference numerals 40 and 80 denote gateway mobile location centers GMLC, each of which is connectable to external users 50 and 90. These external users, located for example either in the home area or in the visited area, may be other subscribers, service provider, network operator, and the like. The GMLC are connected to a home location register HLR in which data concerning the location, location changes and the like of the terminal device 10 (i.e. of the subscriber) are registered.

Reference numeral 70 denotes a service control point SCP, as a controlling part of a intelligent network IN, such as CAMEL, which is connected to other network elements, such as the HLR, VMSC or the like.

There may be the case that one of said external users 50, 90 intends to send, for example, advertisement or the like, which is directed to the area (cell area or the like) in which the subscriber is located. Thus the information of the subscribers which are located in the specific area are needed. Therefore, a request for location information of the subscriber is sent from the respective external user (i.e. from the requesting side) to a corresponding communication network element, i.e. to the corresponding GMLC 40, 80.

When, for example, a MAP location request is sent to the VMSC or the HLR, as described above, the service control point 70 is triggered to perform the operator tailored positioning policy service.

Figure 2:
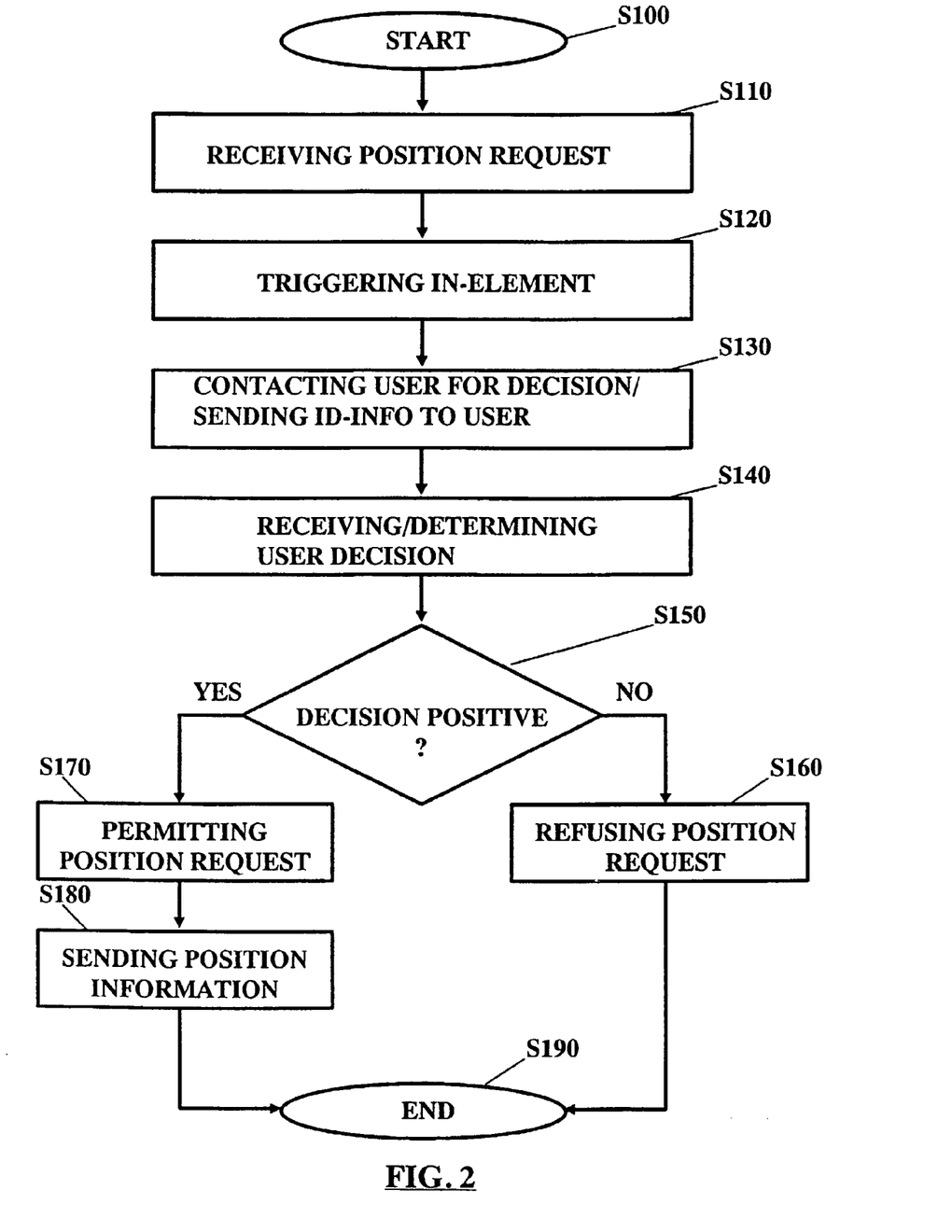
FIG. 2 shows a flowchart of a first embodiment of the present invention.

With reference to FIG. 2, now a first embodiment of the present invention for handling a request for subscriber specific information is described.

In the flowchart shown in FIG. 2, in step S110, the network receives, for example via the GMLC 40, 80, a request for location information of the subscriber 10 from an external user 50, 90. Within said request an identification of the requesting side or the type of service requesting location information might be included. The request can be further processed by sending corresponding request messages to the VMSC 30 or the HLR 60, as described above.

When receiving such a request, the intelligent network element, i.e. the SCP 70, is triggered (step S120). Now, the operator tailored positioning policy service is performed. Therefor, in step S130, the subscriber (i.e. the user) is contacted by using a message service such as SMS, USSD, WTA service indication and the like. This message may also comprise the identification of the requesting side or the type of service requesting location information.

The subscriber is asked, on the basis of the identification indicated in the message, to decide whether said request is to be fulfilled or not, i.e. whether to release the location information to the requesting side or not. This decision can be done for example by a key input or the like. The result of the decision is then sent back to the network.

After receiving the result and determining the decision in step S140, the process proceeds to step S150. Here, when the decision of the subscriber is positive, i.e. the location information can be released to the requesting side, the operator tailored positioning policy service (i.e. the SCP) permits to fulfill the request (step S170) via the VMSC (or HLR) and the GMLC. Then, for example, the GMLC sends the requested location information (S180), which have been received from the HLR or the VMSC after the above mentioned inquiry.

In the case, that the decision of the subscriber is negative, the GMLC refuses (step S160) the request after being informed, for example via the SCP and the VMSC. Therefor, a corresponding message can be sent to the requesting side.

Thereafter, the process is ended (step S190).

In the embodiment described with reference to FIG. 2, a case is described in which the subscriber is contacted directly after the network received a request for subscriber specific information. That is, the subscriber can decide for every request, for example via a key input.

With reference to FIGS. 3 to 8, a further embodiment is described in which several different decision condition modes are included.

Figure 3:
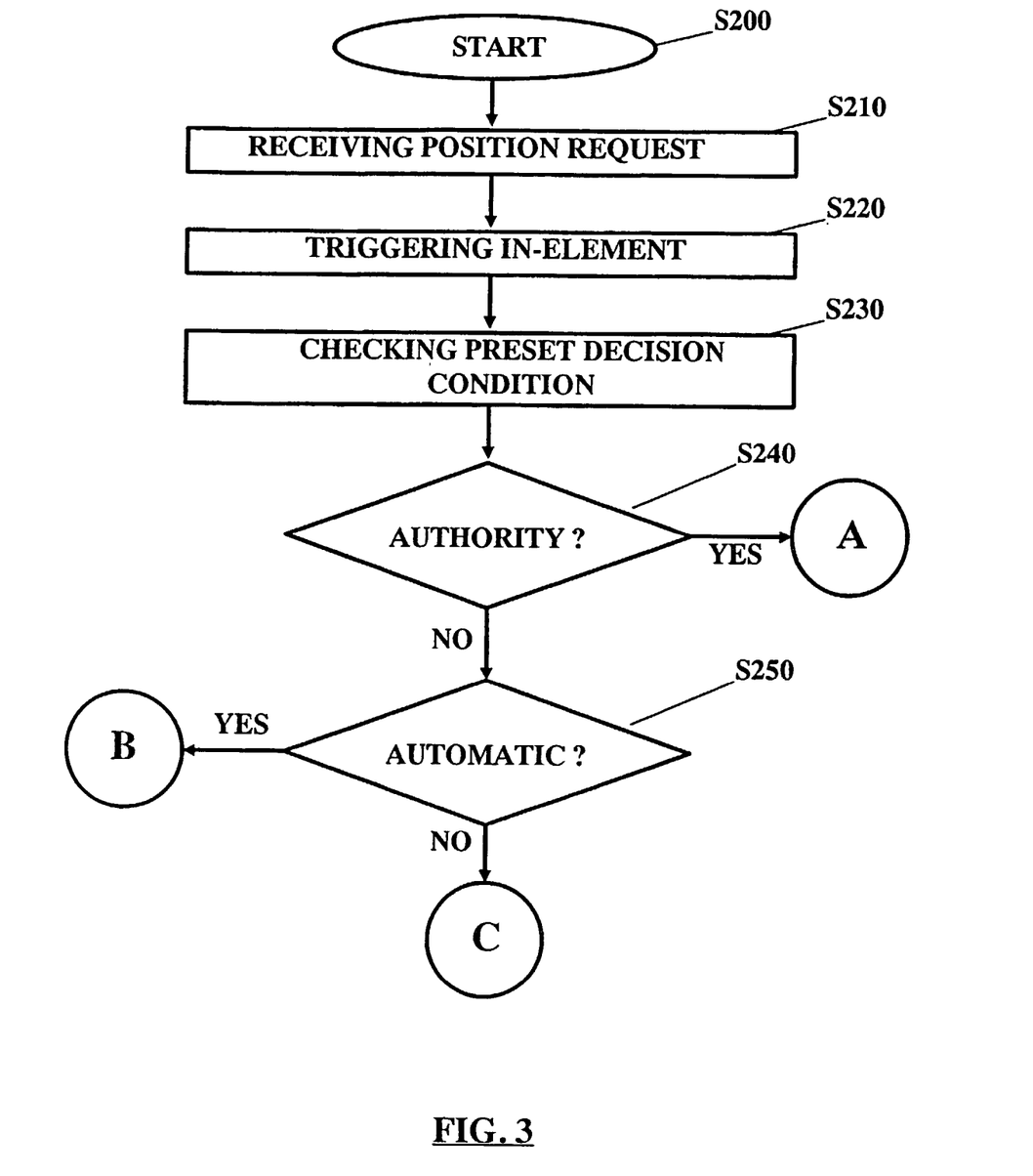
FIG. 3 shows a flowchart of a second embodiment of the present invention.

In FIG. 3, steps S210 and S220 correspond to steps S110 and S120 of FIG. 2, and a description can be omitted.

In step S230, a check is performed which preset decision condition mode is present. The presetting of said mode can be performed for example in advance in the design phase of the network. Alternatively, the subscriber can set the mode, for example via his/her terminal device, and change it, if desired.

First, it is checked whether an authority decision mode is set (step S240). The authority decision mode enables to set a criteria in the operator tailored positioning policy service, by which certain requesting sides are recognized to be authorized to get subscriber specific information. This criteria may be a code or the like which is included in the request. Also, the identification of the requesting side itself can be used as indication for the authorization.

If the authority decision mode is not set, in step S250, a check is made whether the decision mode is an automatic decision mode. In the automatic decision mode, the subscriber or the network operator has set to handle the requests dependent who has made the request. For example, it is possible to set that all requests has to be fulfilled or refused. Another possibility is to set that only requests from specified requesting sides or groups of requesting sides (for example from all tourist information offices or the like) have to be fulfilled.

Alternatively, it is possible to filter location requests not only by checking the identification of the requesting side (i.e. who is requesting), but also by the reason why the location information (or other subscriber specific information) are requested. For example, if the subscriber wishes only to receive tourist information, it is possible to refuse requests due to advertisements and fulfill requests due to tourist information. This requires an information indicating the reason or the kind of information the requesting wishes to send.

Figure 6:
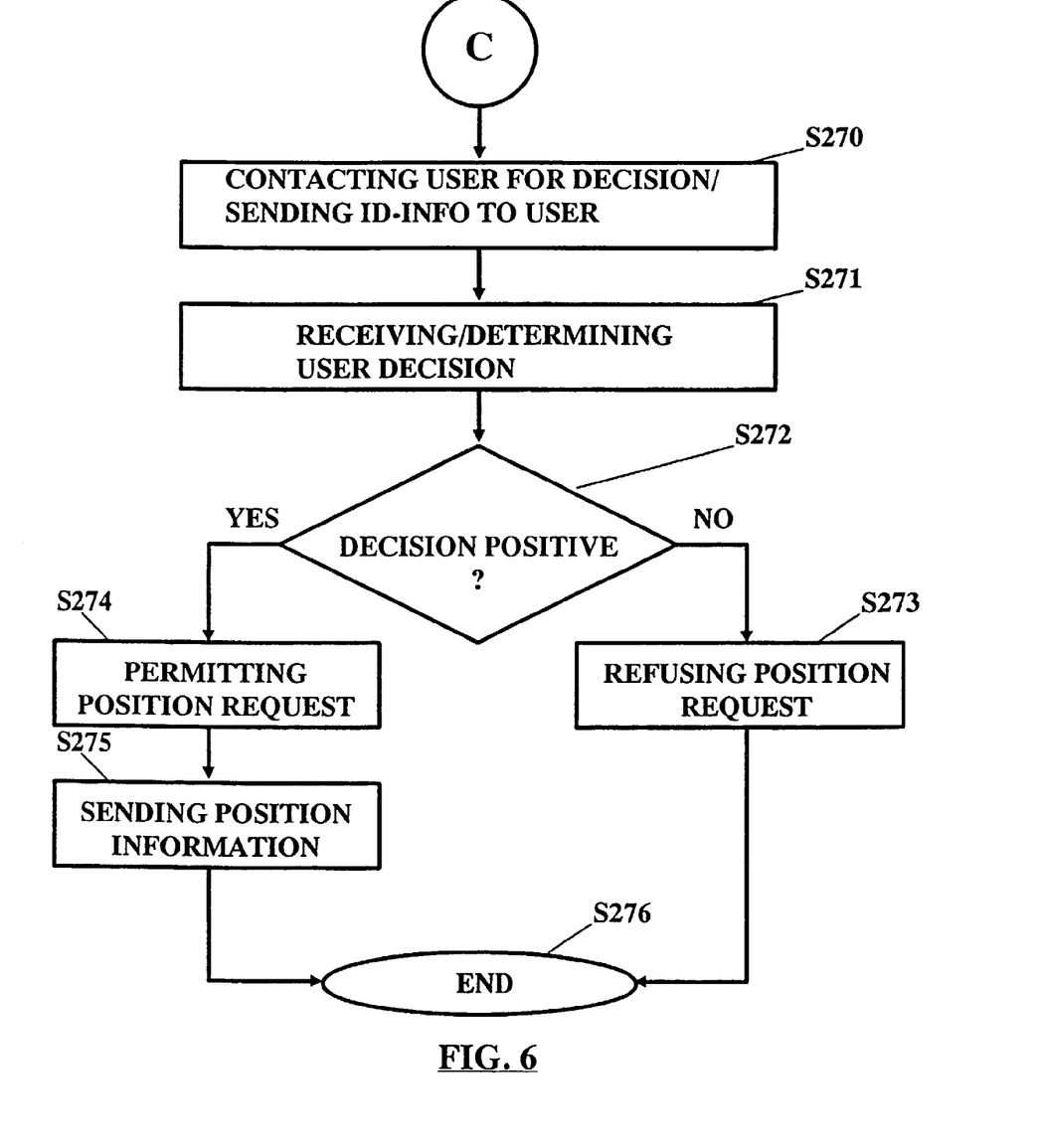
FIG. 6 shows a flowchart of the second embodiment of the present invention.

If also the automatic decision mode is not set, the process proceeds to a step S270 in FIG. 6, i.e. it is adopted that the subscriber has to decide directly whether to fulfill the request or not. The steps S270 to S276 correspond to the steps S130 to S190 in FIG. 2, and a description thereof can be omitted.

Figure 4:
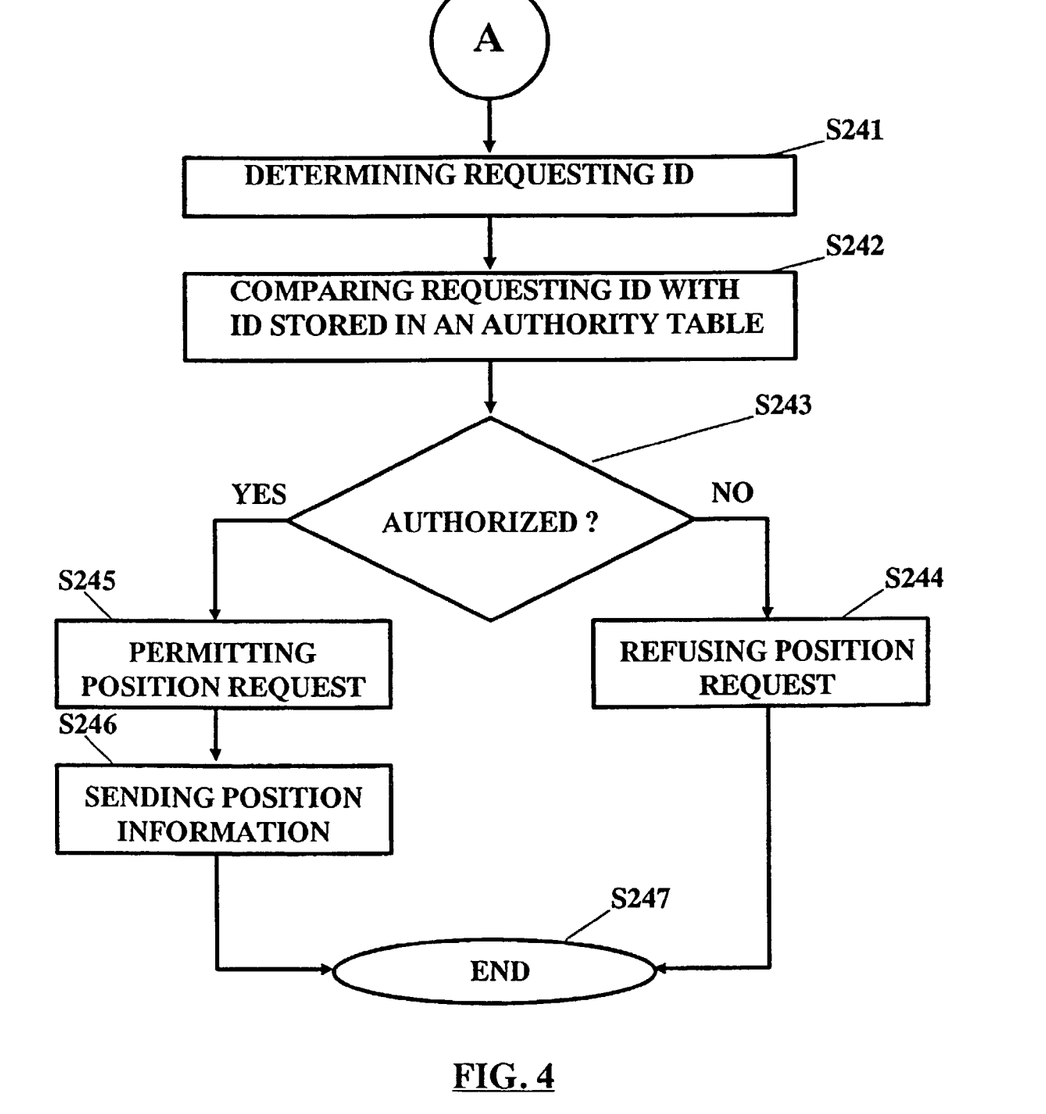
FIG. 4 shows a flowchart of the second embodiment of the present invention.

If in step 5240 of FIG. 3 the authority decision mode is set, the process proceeds to step S241 shown in FIG. 4. Here, the identification of the requesting side is determined. In step S242, the determined identification is compared as a decision criteria with a table containing authorized identifications. Said table is stored for example in a memory. Alternatively, instead of the identification of the requesting side, a code indicating an authorization and sent with the request is determined in step S241 and checked in step S242. The way how to check the authorization can be set for example by the network operator.

Anyhow, in step S243, it is determined, on the basis of a result of the comparison in step S242, whether the requesting side is authorized. If NO, then the request is refused (step S244). If YES, in steps S245 and S246 the request is fulfilled. This corresponds to the steps S160 to S180 in FIG. 2. In step S247, the process is ended.

Figure 5:
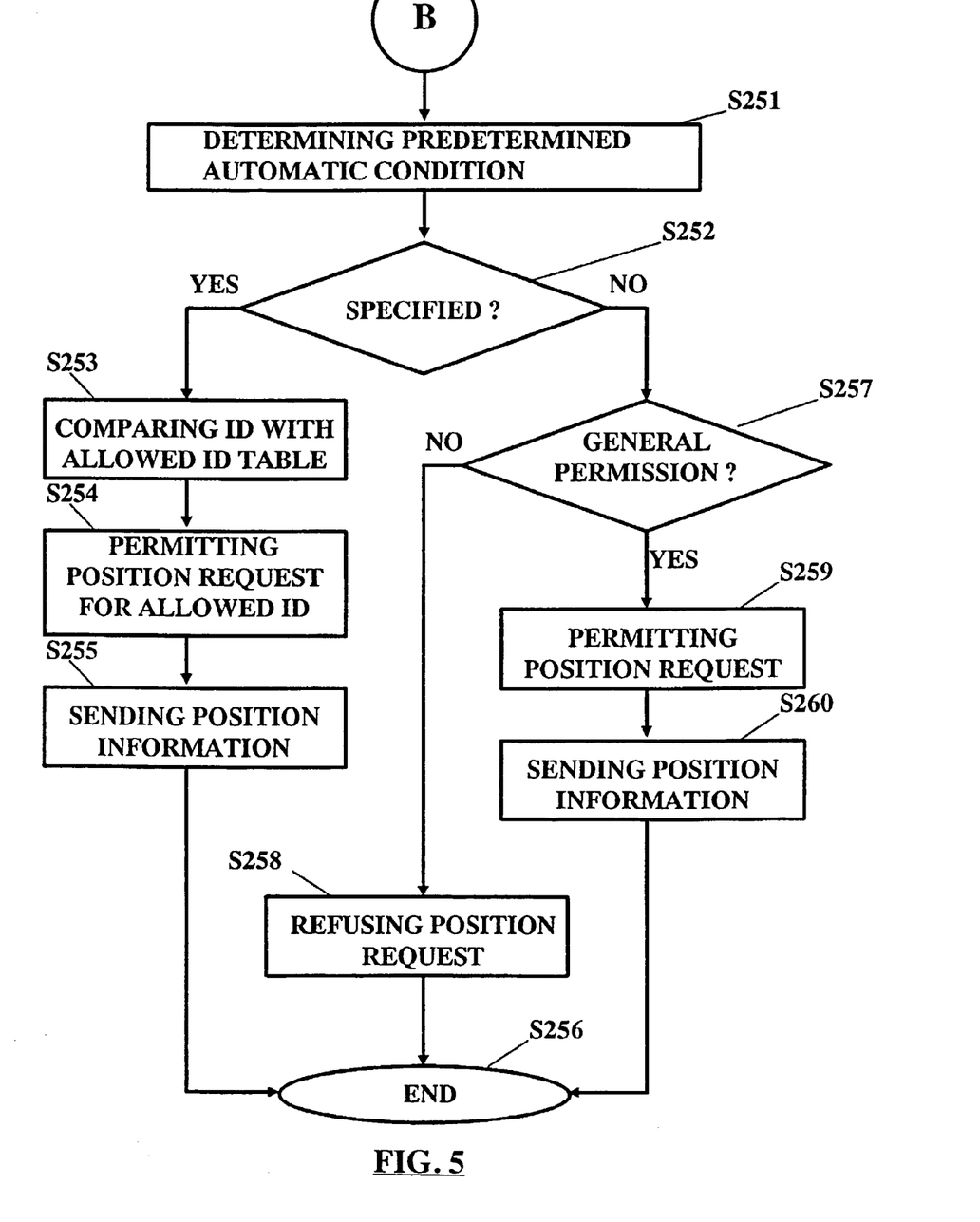
FIG. 5 shows a flowchart of the second embodiment of the present invention.

If in step S250 in FIG. 3 the automatic decision mode is set, the process proceeds to step S251 in FIG. 5. Here, a predetermined automatic decision condition is determined.

If a specified condition is set (step S252), the identification of the requesting side is compared with predetermined identifications of requesting sides for which a request is to be fulfilled (step S254). These predetermined identifications are stored for example in a memory and defined by the subscriber. In the following steps S254 and S255 the request of the requesting sides which are contained in said table of predetermined identifications is fulfilled, as already described above. Although not shown in FIG. 5, it is obvious that requests of requesting sides with identifications not included in said table are to be refused.

If in step S252 no specified condition is set, the process proceeds to step S257 in which it is checked if a general permission condition is set. If the general permission is set, i.e. all requests may be fulfilled, the location information is sent to the requesting side (steps S259, S260). On the other hand, if no general permission is set, all requests are refused (step S258). In step S256, the process is ended.

It is to be noted, that the above described decision modes (automatic, authority) can also be used separately or in other combinations as described above. This can be defined by the corresponding network operator during the design phase of the network or changed later.

Figure 7:
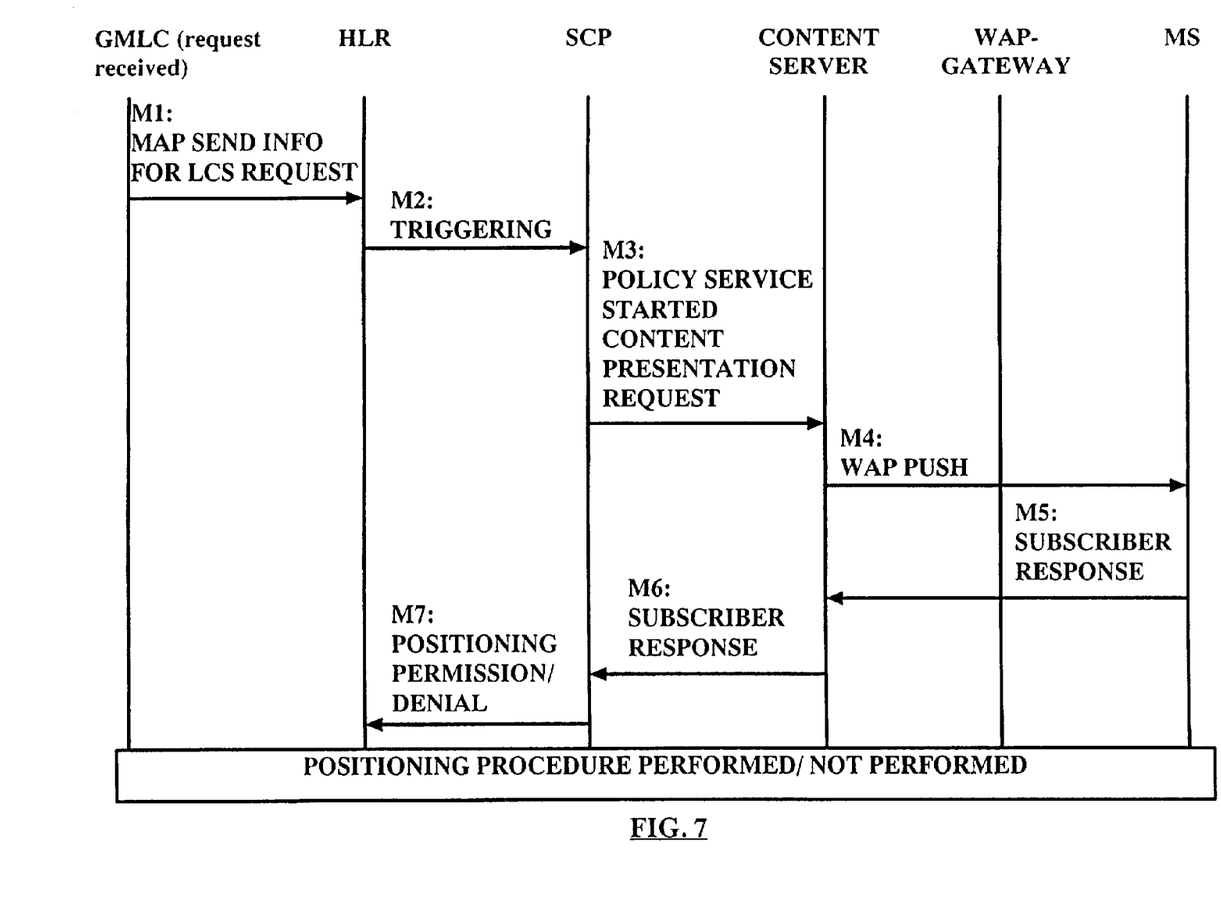
FIG. 7 shows a message chart illustration a message flow for performing the present invention.

In FIG. 7, a message diagram is shown by which a message flow between network elements involved in a request handling according to the present invention is described.

After the GMLC has received a request for, e.g., location information of the subscriber from a requesting side, a MAP sending info for LCS request message M1 is sent to the home location register HLR. This is also described above. In the HLR, it is recognized that a request is handled whereby the service control point SCP is triggered by a corresponding signal M2 to perform the operator tailored positioning policy service.

In the SCP, a content presentation request is started by the policy service. Therefor, a corresponding content presentation request message M3 is sent to a so-called content server, which may be included for example in the SCP, or in a separate network element.

The content server is arranged to form a message by which the subscriber is informed about the request by a message containing the necessary information in a form usable for, e.g., a decision via a key input at the terminal device MS. The form of this message is for example a WAP page or the like which can be displayed or represented at the mobile station MS.

From the content server, the massage is delivered for example by a WAP content push (message M4) via a WAP gateway to the mobile station (i.e. to the subscriber) for transmitting the information indicating the request. The content may include Java or another content which is produced by the corresponding terminal.

The message is received at the mobile station MS and processed accordingly (i.e. displaying on a screen, receiving and processing input by the subscriber and the like). Next, from the mobile station MS, a message M5 indicating the response of the subscriber (determined by the key input or the like) is sent back via WAP gateway to the content server. Therefrom, it is forwarded to the service control point SCP (message M6). Here, the message is processed by the policy service. On the basis of said processing, it is decided whether to give a permission or a denial concerning the request. This is indicated to the HLR by a corresponding message M7. Then, depending on the decision, a positioning, i.e. a sending of location information, is performed, or the positioning is refused, as commonly known to persons skilled in the art.

Figure 8:
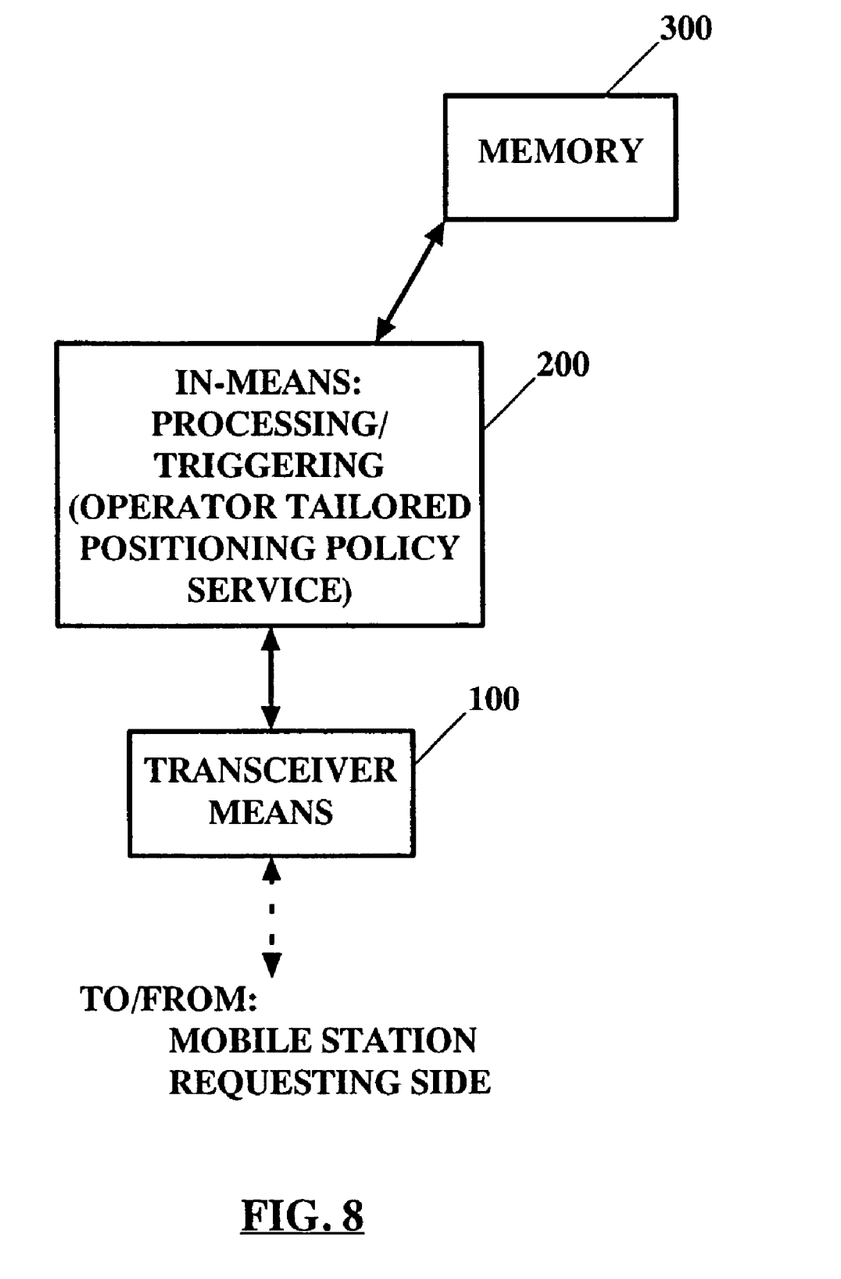
FIG. 8 shows a device arranged to perform the method according to the present invention.

FIG. 8 refers to a device according to the present invention. Reference numeral 100 denotes a transceiver means for communicating with the subscriber and the requesting side. There can be only one transceiver means for communicating with both sides or separated transceiver means each of which arranged to communicate with one counterpart. This may depend on the type of messages used for the communications, i.e. for the request, the message for asking a decision and the like.

Reference numeral 200 denotes a intelligent network means for processing and triggering the operator tailored positioning policy service, i.e. for deciding whether the received request for subscriber specific information may be fulfilled for the respective requesting side or not. The way how the decision is made can be for example consulting the subscriber/user directly, using a predetermined decision condition (automatic, authority) or the like, as described above. The means 200 is arranged to form a message for the subscriber, to determine which decision is made, to handle the request dependent on this decision (refuse/fulfill). Furthermore, it is arranged to determine whether and which decision condition mode is set. Also a comparison between the identification of the requesting side and, e.g., stored identifications is performed by the intelligent network means 200.

Reference numeral 300 denotes a memory which may be used for storing different kinds of data. For example, identifications of requesting side which are authorized can be stored herein. Also one or more codes indicating an authorization of a requesting side can be stored. These data are then used by the intelligent network means 200 for a comparison with a received identification or code from a requesting side.

The memory 300 can also be used for storing identification data of requesting sides predetermined by the subscriber. Furthermore, it is possible to store information concerning a preset decision mode (automatic and the like).

As an alternative, received requests or at least an indication of received requests (counter) can be stored in said memory 300, for example for statistical purposes.

There can be used one single memory (RAM or the like), or different means used for separate storing functions (for example one for authorized identifications, one for logging, and the like).

It should be noted, that the means of the device in FIG. 8 can be included in one network element or in separate network elements. Moreover, the function of the corresponding means, in particular of means 200, can be distributed among different parts of the communication network.

The present invention proposes a method for processing an information request in a communication network, wherein a requesting side contacts a first element of said communication network and sends a request for specific information of a subscriber, said method comprising the steps of receiving a request for subscriber specific information, processing the request for said subscriber specific information, wherein in said processing a second network element is triggered, checking by said second network element, whether a permission for releasing said subscriber specific information to said requesting side is present, and, if a permission for releasing is present, forwarding said subscriber specific information to said requesting side, and if no permission for releasing is present, refusing the request for said subscriber specific information. The present invention also proposes a corresponding device and/or system. The present invention enables a consultation of the subscriber whether he/she permits a release of information concerning him/her, e.g. by using an intelligent network environment.

It should be understood that the above description and accompanying figures are merely intended to illustrate the present invention by way of example only. The preferred embodiments of the present invention may thus vary within the scope of the attached claims.

The invention claimed is:

1. A method for processing an information request in a communication network, comprising:
   sending, by a requesting side, a request for specific information of a subscriber to a first element of said communication network, the requesting side comprising an external user other than said subscriber;
   receiving, at the first element of the communication network, the request for subscriber specific information;
   processing, by the communication network, the request for said subscriber specific information, wherein in said processing of a second network element is triggered, said processing further comprising determining, based on a preset decision mode indicator, when a preset request response should be considered, the preset decision mode indicator being selectively switched between a first and a second value, by the subscriber as desired; and
   when the value of the preset decision mode indicator is the second value, contacting, in response to the triggering of the second network element and without considering the preset request response of said subscriber, transmitting a message indicating said request of said requesting side to the subscriber, said message asking said subscriber for a request response regarding whether to release said subscriber specific information
   when the value of the preset decision mode indicator is the first value, determining a request response regarding whether to release said subscriber specific information based on the preset request response previously indicated by said subscriber;
   receiving and determining said request response of said subscriber; and
   forwarding said subscriber specific information to said requesting side when a permission for releasing is present, and refusing the request for said subscriber specific information when no permission for releasing is present.

2. A method according to claim 1, wherein said request comprises an identification of said requesting side.

3. A method according to claim 1, wherein said request comprises an information concerning a reason for the request by the requesting side.

4. A method according to claim 1, wherein said requesting side is a service provider.

5. A method according to claim 1, wherein said requesting side is another subscriber.

6. A method according to claim 1, wherein said specific subscriber information requested by said requesting side is a location information of said subscriber.

7. A method according to claim 6, wherein said requesting side contacts for receiving said subscriber specific information a visited mobile service switching center which is connected to said subscriber, and said request is sent in the form of a MAP location request.

8. A method according to claim 6, wherein said requesting side contacts for receiving said subscriber specific information a home location register, and said request is sent in the form of a MAP information request.

9. A method according to claim 1, wherein said second network element is a service control point of an intelligent network.

10. A method according to claim 9 wherein said service control point provides an operator tailored positioning policy service.

11. A method according to claim 1, wherein said message indicating said request of said requesting side is a short message and transmitted by using a short message service.

12. A method according to claim 1, wherein said message indicating said request of said requesting side is an unstructured supplementary service data message.

13. A method according to claim 1, wherein said message indicating said request of said requesting side is a wireless telephony application indication and transmitted by using a wireless telephony application service.

14. A method according to claim 1, wherein said message is delivered by using a wireless application protocol content push.

15. A method according to claim 1, further comprising:
if an authority mode is activated when the value of said preset decision mode indicator is the first value, determining an identification of said requesting side;
comparing, whether said identification is included in a table stored in a memory containing authorized identifications; and
if the requesting side is authorized, fulfilling said request, or, if the requesting side is not authorized, refusing said request.

16. A method according to claim 1, further comprising:
if an automatic mode is activated when the value of said preset decision mode indicator is the first value, determining the kind of said automatic mode activated.

17. A method according to claim 16, further comprising
if said automatic mode activated is a specified automatic mode, comparing, whether an identification of said requesting side is included in a table stored in a memory containing identifications stored by said subscriber in a memory; and
fulfilling said request for a requesting side the identification of which is included in said table.

18. A method according to claim 16, further comprising:
if said automatic mode activated is a general permission automatic mode, determining, whether the request for said subscriber specific information is to be fulfilled for all requests or to be refused for all requests; and
if said request is to be fulfilled for all requests, sending said subscriber specific information, or, if said request is to be refused for all requests, refusing said request.

19. A method according to claim 1, further comprising the step of logging said request for subscriber specific information in a memory.

20. A device used in a communication network for processing an information request for specific information of a subscriber, the device comprising:
receiving means adapted to receive, via a first element of said communication device, a request for subscriber specific information of a subscriber, the request being initiated by an external user other than the subscriber;
means adapted to process the request for subscriber specific information, to determine, based on a preset decision mode indicator, whether a preset request response should be considered, said preset decision mode indicator being selectively switched between an first and a second value by said subscriber as desired, to contact said subscriber, and to transmit a message to the subscriber indicating said request of said requesting side without considering the preset request response when the value of the preset decision mode indicator is the second value, said message asking the subscriber for a request response regarding whether to release said subscriber specific information, to determine a request response regarding whether to release said subscriber specific information based on the preset request response previously indicated by said subscriber when the value of the preset decision mode indicator is the first value, to receive said request response of said subscriber and to check on the basis of said request response of said subscriber whether a permission for releasing said subscriber specific information to said requesting side is present, and
means adapted to forward said subscriber specific information to said requesting side, if a permission for releasing is present.

21. A device according to claim 20, wherein said request comprises an identification of said requesting side.

22. A device according to claim 20, wherein said request comprises an information concerning a reason for the request by the requesting side.

23. A device according to claim 20, wherein said requesting side is a service provider.

24. A device according to claim 20, wherein said requesting side is another subscriber.

25. A device according to claim 20, wherein said specific subscriber information requested by said requesting side is a location information of said subscriber.

26. A device according to claim 25, wherein said requesting side contacts for receiving said subscriber specific information a visited mobile service switching center which is connected to said subscriber, and said request is sent in the form of a MAP location request.

27. A device according to claim 26, wherein said requesting side contacts for receiving said subscriber specific information a home location register, and said request is sent in the form of a MAP information request.

28. A device according to claim 26, wherein said message is delivered by using a wireless application protocol content push.

29. A device according to claim 20, wherein said means adapted to process and check said request is implemented in a service control point of an intelligent network.

30. A device according to claim 29, wherein said service control point is arranged to provide an operator tailored positioning policy service.

31. A device according to claim 21, wherein said means adapted to process and check said request is triggered after receiving said request for subscriber specific information.

32. A device according to claim 20, wherein said message indicating said request of said requesting side is a short message and transmitted by using a short message service.

33. A device according to claim 20, wherein said message indicating said request of said requesting side is an unstructured supplementary service data message.

34. A device according to claim 20, wherein said message indicating said request of said requesting side is a wireless telephony application indication and transmitted by using a wireless telephony application service.

35. A device according to claim 31, said device further comprises a memory, and said means for processing and checking said request is arranged to compare an identification of said requesting side with identification data stored in said memory.

36. A device according to claim 35, wherein said request for subscriber specific information is logged in said memory.

37. A communication system, said system comprising:
at least a terminal device of a subscriber;
a base station subsystem for connecting said terminal device;
a serving center for controlling communication connections to and from said terminal device; and
a location center for detecting the location of said terminal device within said communication system; and
a service control point for providing an operator tailored positioning policy service and triggered by said service center or said location center to perform said operator tailored positioning policy service, wherein said operator tailored positioning policy service is adapted to determine, based on a preset decision mode indicator, whether a preset request response should be considered, said preset decision mode indicator being selectively switched between a first and a second value by said subscriber as desired, to involve said subscriber in a decision whether a request for subscriber specific information made by a requesting side is to be fulfilled without considering the preset request response when the value of the preset decision mode indicator is the second value, the requesting side being an external user other than the subscriber, by contacting said subscriber and transmitting a message indicating said request of said requesting side to the subscriber, the message asking the subscriber whether to release said subscriber specific information, and to determine a request response regarding whether to release said subscriber specific information based on the preset request response previously indicated by said subscriber if when the value of the preset decision mode indicator is in effect the first value, and by receiving and determining said decision of said subscriber.

38. A method according to claim 1, wherein said determining whether the value of the preset decision mode indicator is the first value comprises both determining whether an authority mode is in effect and determining whether an automatic mode is in effect, both said automatic mode and said authority mode being selectably switched into or out of effect by said subscriber as desired, the decision in the authority mode being based on one of an identity of said external user making the request and a code used in the request and the decision in the automatic mode being based on the subscribers previously entered answer.

* * * * *